United States Patent [19]

Rigaux

[11] Patent Number: 5,231,391
[45] Date of Patent: Jul. 27, 1993

[54] PASSIVE PICK-UP DEVICE FOR MONITORING THE STATE OF THE TIRE OF A VEHICLE WHEEL AND MEASURING THE ROTATION CHARACTERISTICS OF THE WHEEL

[75] Inventor: Christian Rigaux, Artannes sur Indre, France

[73] Assignee: SKF France, France

[21] Appl. No.: 794,237

[22] Filed: Nov. 19, 1991

[30] Foreign Application Priority Data

Nov. 30, 1990 [FR] France ................... 90 15052

[51] Int. Cl.$^5$ ............................................. B60C 23/00
[52] U.S. Cl. ................................. 340/448; 340/442; 340/445; 340/447; 73/146.5; 116/34 R
[58] Field of Search ............... 340/442, 445, 447, 448; 73/146.5; 116/34 R

[56] References Cited

U.S. PATENT DOCUMENTS

| | | |
|---|---|---|
| 3,895,347 | 7/1975 | Takusugawa et al. ............. 340/447 |
| 4,048,614 | 9/1977 | Shumway . |
| 4,238,955 | 12/1980 | Reinecke . |
| 4,334,428 | 6/1982 | Fima et al. .................... 340/448 |
| 4,742,857 | 5/1978 | Gandhi ........................ 340/445 |
| 4,749,993 | 6/1988 | Szabo et al. .................. 340/448 |
| 4,818,939 | 4/1989 | Takahashi et al. . |
| 4,891,973 | 1/1990 | Bollender et al. .............. 340/448 |

FOREIGN PATENT DOCUMENTS 027308 1/1981 European Pat. Off. .
0235750 6/1987 European Pat. Off. .
728043 7/1989 Fed. Rep. of Germany .
2420439 10/1979 France .

OTHER PUBLICATIONS

J. Mayfield, "Cockpit Display of Aircraft Tire Pressure", Aviation Week & Space Technology, May 7, 1979, New York, USA, pp. 46, 47, 49, 51 and 54.

Primary Examiner—Jin F. Ng
Assistant Examiner—Nina Tong
Attorney, Agent, or Firm—Beveridge, DeGrandi, Weilacher & Young

[57] ABSTRACT

A device for monitoring the state of the tire of a vehicle wheel and for measuring the rotation characteristics of the wheel is described herein. The device includes a rotating encoder element constituted by a multipolar magnetic ring, whereby magnetic segments of different polarity are distributed circumferentially in a regular and alternating manner. The device further includes a transmitter coil mounted coaxially with the multipolar ring, a fixed pick-up element constituted by an induction coil enclosed in a U-shaped section of an annular flux focusing element arranged coaxially with the multipolar magnetic ring. The device is energized by an alternative electric current flowing through the transmitting coil which generates a magnetic field superimposed on the magnetic field created by the multipolar magnetic ring, wherein the pick-up element delivers a signal relating to the rotation characteristics of the wheel and the state of the tire.

25 Claims, 3 Drawing Sheets

PASSIVE PICK-UP DEVICE FOR MONITORING THE STATE OF THE TIRE OF A VEHICLE WHEEL AND MEASURING THE ROTATION CHARACTERISTICS OF THE WHEEL

This invention relates to a device whereby, on the one hand, the state of the tires of at least one wheel of a vehicle can be monitored, and on the other hand, the rotation characteristics of the wheel, such as rotation speed, angular acceleration, etc. can be measured.

Such a device can be used for many types of wheeled vehicles fitted with tires. Motor cars, road transport vehicles, metro carriages and the landing gear of aircraft may be cited as examples.

In fact, during the operation of such vehicles, it is advantageous to know not only the rotation characteristics of the wheels fitted to them, but also the state of tires on these wheels so as in particular to avoid the underinflation or overheating of the tires, in order to preserve the safety of the vehicles and consequently that of the passengers.

From European Patent Application No. 0,117,172 a device is known for detection of underinflation of a tire and for measurement of the kinetic state of the wheel of a vehicle. The device comprises a toothed wheel turning with the wheel, the teeth of which are constructed using a non-magnetic material conductive of electricity, with the exception of one of them which is constructed using a non-conductive material carrying a conductive winding, a fixed electromagnet constituting the pick-up and in which the axially orientated teeth of the toothed wheel generate a signal which will be processed by a computer. The conductive winding can be short-circuited or open depending on the state of inflation of the tire.

From French Patent Application No. 2,420,439 a tire pressure monitoring device is also known which comprises a toothed ring the teeth of which are axially orientated. The toothed ring is associated with a piston mechanism the functioning of which depends on the tire pressure. When the tire is underinflated, the mechanism allows the space between two consecutive teeth of the ring to be filled by means of a piston at one end of a rod, so that the signal induced in the pick-up shows an irregularity when it passes in front of the end of the rod.

The subject of the present invention is a device whereby the state of the tires of a wheel, such as the pressure and/or the temperature, can be monitored and simultaneously the rotation characteristics of the wheel, such as the rotation speed and the angular acceleration, can be measured, in a simple and inexpensive manner.

According to the invention, the device comprises an encoder element securely attached to the rotating part of the wheel hub, a means for monitoring the state of a tire of the wheel in rotation capable of modifying the characteristics of the encoder element depending on the value of at least one predetermined parameter of the sate of the tire, and a fixed pick-up element cooperating with the encoder element to deliver a signal to a computer with a view to supplying information on the rotation characteristics of the wheel on the one hand, and the state of the tire on the other hand.

According to the invention, the encoder element is constituted by a multipolar magnetic ring whereof the magnetized segments of different polarity are distributed circumferentially in regular and alternating manner, and by a transmitter coil mounted coaxially with the multipolar ring on the rotating part of the wheel hub, an electric current flowing through said coil in order to generate a magnetic field superimposing itself on the magnetic field created by the multipolar ring in line with the pick-up element, the amplitude of the signal induced in the pick-up element and corresponding to the magnetic field generated by the transmitter coil being a direct function of the value of the parameter monitored.

The multipolar ring securely attached to a rotating element of the wheel hub can be constructed using various materials capable of receiving permanent multipolar magnetization. The materials chosen may be rigid, such as metal alloys, or flexible such as plastic material or elastomer filled with a magnetizable powder. The wide diversity of the choice of materials greatly facilitates integration of the corresponding multipolar ring into mechanical sub-assemblies often of small dimensions, unlike the conventional rigid toothed wheels mentioned above.

According to the invention, the fixed pick-up element comprises an induction receiver coil of annular shape and an annular magnetic flux focusing element arranged coaxially with the multipolar ring and presenting a U-shaped cross-section whereof the end parts of the two branches form an annular space in which the multipolar ring is in rotation. The induction coil is preferably arranged at the bottom of the U-shaped cross-section of the flux focusing element so as to be opposite the multipolar ring.

Advantageously, at least one of the end parts of the branches of the U-shaped cross-section of the flux focusing element is provided with teeth, regularly spaced circumferentially by absences of material, so that said teeth can focus and channel the magnetic field lines in the same direction across the induction coil.

In this manner, when a single branch of the U is toothed, all of the teeth are at all times situated opposite the magnetized segments the magnetic polarity of which is the same. When both branches of the U comprise teeth, the teeth are combined in pairs so that two poles of opposite signs of a magnetized segment of the multipolar ring are simultaneously opposite two teeth of the flux focusing element.

The magnetic flux focusing element is constructed using a ferromagnetic material.

The transmitter coil may be continuously energized with alternating electric current; the nominal amplitude of the magnetic field thus generated in line with the pick-up element is then proportional to the value of the parameter or parameters monitored. The frequency of the alternating current is preferably situated outside the range of frequencies relating to the variations in magnetic field created by the multipolar ring. If several parameters are monitored simultaneously, the transmitter coil is subdivided into as many independent parts as there are parameters to monitor, each part being energized by a source of alternating current. The current frequencies are then selected to be different from one another.

According to another embodiment of the invention, the transmitter coil is energized with alternating electric current only when the value of the parameter monitored is considered to be abnormal with respect to a critical threshold.

It is possible to provide several electrical sources each connected to the transmitter coil and to a specific pick-up for the detection of a specific parameter, in order for example to monitor simultaneously the pressure and the temperature of the tire.

The electronic computer linked to the pick-up element, that is to say to the induction coil, proceeds in a manner known per se, to analyze the signal so as to be able to deduce from it the information on the speed of the wheel and its variations, and also the parameters measured in the tire.

It is thus possible in this manner to choose for example monitoring either of the tire inflation pressure, or of the tire temperature, or of both simultaneously.

The invention will be better understood by studying the detailed description of an embodiment taken as a by no means exhaustive example, illustrated by the attached drawings in which.

Figure 1:
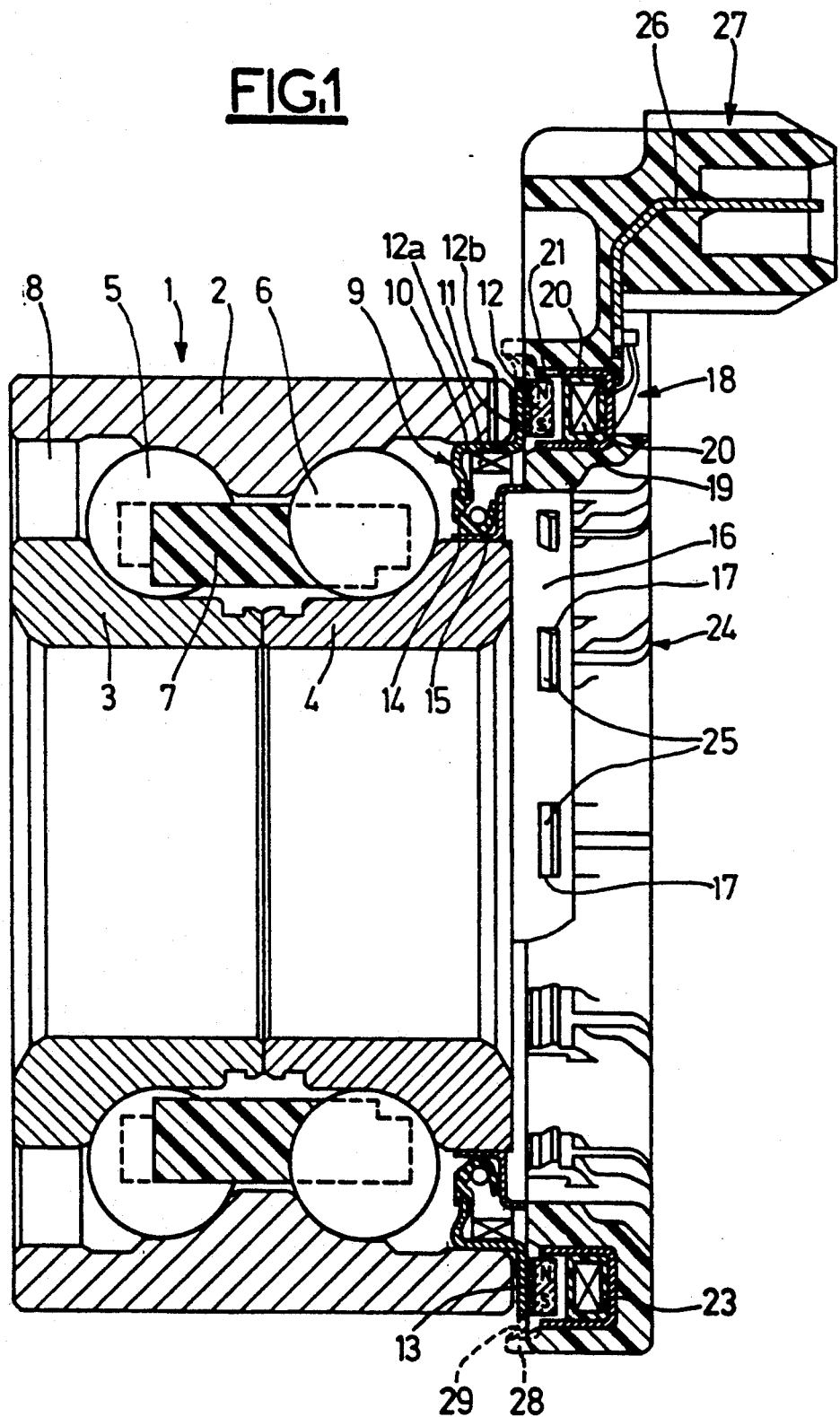
FIG. 1 is an axial sectional view of a device according to the invention fitted to a wheel not shown and comprising a multipolar ring with radial magnetization.

As shown in FIG. 1, the device for monitoring the state of a tire of a vehicle wheel and for measuring the rotation characteristics of the wheel, according to the invention, is mounted on a rolling bearing 1 comprising a rotating outer race 2 and two non-rotating inner half-races 3, 4. Between the outer race 2 and the two inner half-races 3, 4 are mounted two rows of balls 5, 6 in oblique contact maintained at an appropriate spacing by a cage 7. The outer race 2 may be securely attached to or be an integral part of the rotating wheel hub not shown. Rotation of the wheel leads directly to rotation of the outer race 2 of the rolling bearing 1.

The lateral sealing of the rolling bearing 1 is provided on one side by a seal of conventional type 8 and on the other by a seal 9 adapted for mounting of the encoder element of the device of the invention. To this end, the seal 9 presents a support flange 10, preferably in non-magnetic material such as a stainless steel, mounted in the bore of the rotating outer race 2 and fitted with a radial collar 11, a radially magnetized multipolar ring 12 being fixed onto said radial collar 11 directly or through the intermediary of a non-magnetic ring 13 constructed for example in an elastomer or in a plastic material. The seal 9 also has an annular sealing ring 14 for example in rubber coming into friction contact with an armature 15 mounted around the half-race 4. The armature 15 presents a collar 16 having a plurality of slots 17.

According to the invention, the multipolar ring 12 is constituted by a plurality of magnetized segments of different polarity distributed circumferentially in alternating and regular manner. A transmitter coil 12a is mounted on the support flange 10 coaxially with the multipolar ring 12 and electrically connected to a means for monitoring the state of the of the tire of the rotating wheel not shown via a link 12b, the means for monitoring optionally being a pressure switch for the pressure or a thermoswitch for the temperature. The multipolar ring 12 and the transmitter coil 12a are driven in rotation by the rotating outer race 2 of the rolling bearing 1 opposite a pick-up element 18 fixed in rotation.

The pick-up element 18 comprises an induction receiver coil 19 and a magnetic flux focusing element 20 constructed using a ferromagnetic material. The flux focusing element 20 has an annular shape the cross-section of which is U-shaped. The focusing element 20 encloses the induction coil 19 at the bottom of the U the branches of which project beyond the coil 19 so as to be opposite the inner and outer circumferences of the multipolar ring 12. In this example, the branch of the U situated radially outwards is provided with a plurality of teeth 21 of width substantially the same as the circumferential width of one magnetized segment, the teeth 21 being regularly spaced circumferentially so as to be located simultaneously opposite the magnetized segments of the same polarity.

The assembly constituted by the induction coil 19 and the focusing element 20 is advantageously buried by being moulded inside a block 23 of mouldable and electrically insulating resin or plastic material so as to constitute the pick-up element 18 as a whole.

The pick-up element 18 is securely attached to a mounting ring 24 which has a plurality of radial claws 25 capable of coming to click home into the slots 17 of the armature 15, the claws 25 being arranged in the bore of the ring 24 and coming to enter the slots 17 from the outside. In this manner, the pick-up element 18 can easily be mounted opposite the multipolar ring 12 which is already in place, the clicking home of the mounting ring 24 making it possible to reduce positioning errors during assembly.

The induction coil 19 is linked electrically to connection pins 26 of a connection head 27 integral with the mounting ring 24 for transmission of the signal emitted by the coil 19 as far as an external processor unit forming part for example of a motor vehicle wheel anti-locking device.

If necessary, additional sealing means may be provided for complete isolation from the external environment. As an example, FIG. 1 shows in broken lines a variant in which the mounting ring 24 has a peripheral rim 28 which comes into contact with a sealing lip 29 forming part of the ring 13 serving as mounting for the multipolar ring 12.

Figure 3:
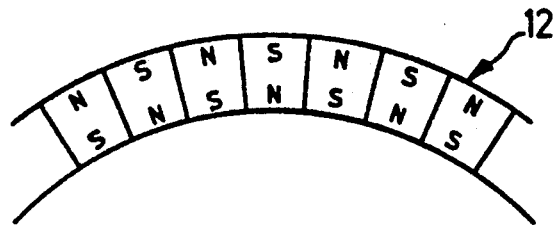
FIGS. 3, 4 and 5 give three types of radial, axial, circumferential magnetization of the multipolar ring according to the invention.
Figure 4:
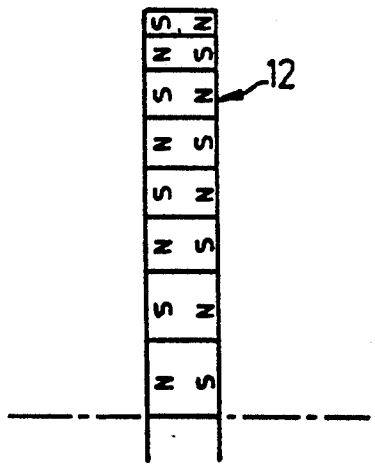
Figure 5:
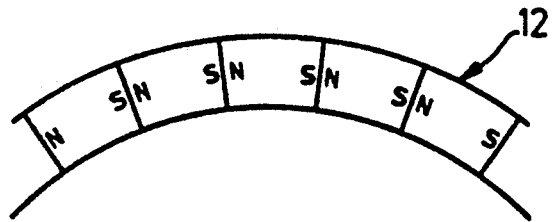

The multipolar ring may comprise radial magnetization as in the example which has just been described (FIG. 3) but it may equally have axial magnetization (FIG. 4) or circumferential magnetization (FIG. 5). To this end it is sufficient to arrange the pick-up element 18 radially or axially as appropriate with respect to the multipolar ring 12 in order to make use of the periodic variation of the magnetic field when the multipolar ring is driven in rotation.

Figure 2A:
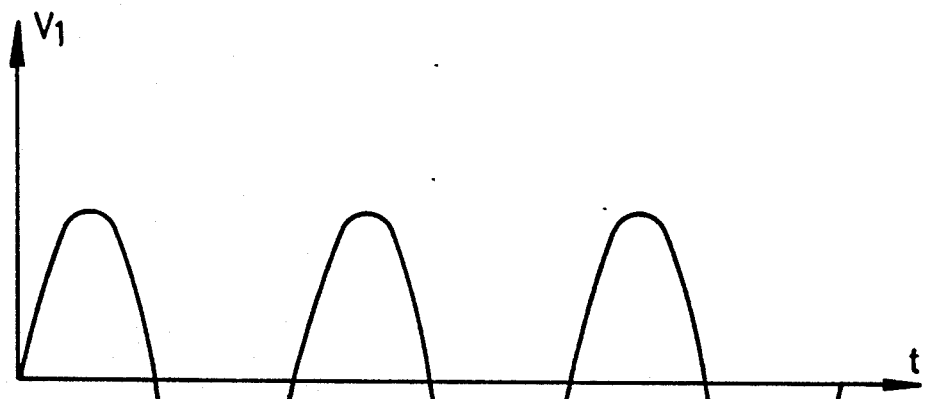
FIGS. 2a, 2b and 2c are electrical signals induced into the receiver coil of the invention.
Figure 2B:
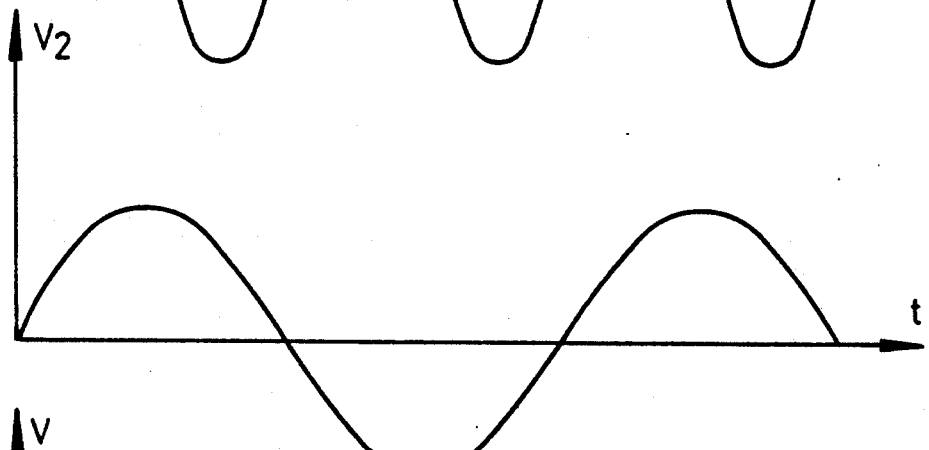
Figure 2C:
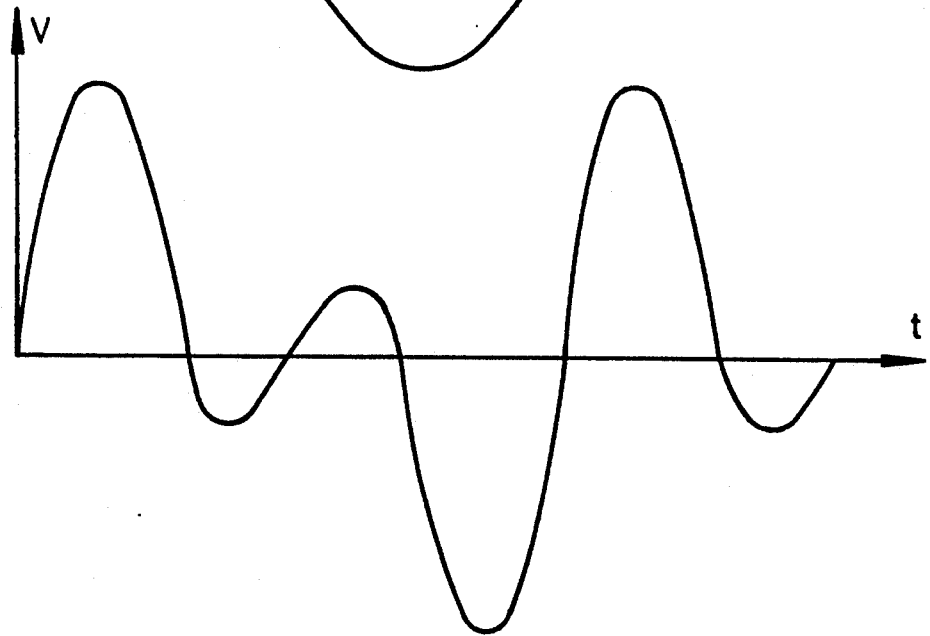

FIGS. 2a to 2c show the operation of the device of the invention which permits on the one hand measurement of the rotation speed or of the variations in rotation speed of the wheel and, on the other hand, monitoring of the sate of the tire of the wheel.

FIGS. 2a, 2b and 2c show the electrical signals generated in the induction coil 19 caused respectively by the variations in the magnetic field of the multipolar ring 12, by the magnetic field created by the transmitter coil 12a when the latter is continuously energized with alternating current, and lastly the resultant voltage of the signal generated in the induction coil 19 and delivered to the computer (not shown).

The two induced signals (FIGS. 2a and 2b) are periodic and of substantially sinusoidal form with respect to time. The respective frequencies of these two signals are distinct from one another so that the computer can afterwards break down the resultant signal (FIG. 2c), in a manner known per se, so as to deduce from it, on the one hand, the speed of rotation and the angular acceleration of the wheel, and on the other hand whether or not there are any aberrations in the state of the tire by monitoring for example the amplitude of the resultant signal.

I claim:

1. A device for monitoring a state of a tire of a vehicle wheel and for measuring rotation characteristics of the wheel, comprising:

an encoder assembly securely attached to a rotating part of a hub of a wheel, the encoder assembly including a multipolar magnetic ring provided with magnetized segments of different polarity distributed circumferentially in a regular and alternating manner, and a transmitter coil mounted coaxially with the multipolar magnetic ring on the rotating part of the wheel hub;

a fixed pick-up means cooperating with the encoder assembly to deliver a signal representing the rotation characteristics of the wheel and a state of the tire;

monitoring means for monitoring the state of the tire of the wheel in rotation adapted to modify characteristics of the encoder assembly depending on a value of a predetermined parameter of the state of the tire;

wherein the transmitter coil is energized with an alternating electric current either only when the value of the parameter monitored is considered to be abnormal with respect to a critical threshold, or continuously, the transmitter coil generating a magnetic field superimposing itself on a magnetic field created by the multipolar ring, whereby the frequency of the alternating current is situated outside a range of frequencies relating to variations in the magnetic field generated by the multipolar ring in rotation with the wheel, the amplitude of the magnetic field created by the transmitter coil being proportional to the value of the parameter monitored.

2. A device according to claim 1, wherein the transmitter coil includes two or more independent parts, each being energized by a source of alternating current and corresponding to a specific parameter of the state of the tire, the frequencies of the currents being different from one another.

3. A device according to claim 1, wherein the parameter monitored is the pressure of the tire, and the critical threshold is constituted either by a minimum pressure threshold, or a maximum pressure threshold, or by both minimum and maximum pressure thresholds.

4. A device according to claim 1, wherein the parameter monitored is the temperature of the tire, and the critical threshold corresponds to a maximum temperature threshold.

5. A device according to claim 1, wherein the device monitors simultaneously the pressure and the temperature of the tire by means of two independent sources of current, each connected to the transmitter coil.

6. A device according to claim 4, wherein the transmitter coil includes two or more independent parts, each being energized by a source of alternating current and corresponding to a specific parameter of the state of the tire, the frequencies of the currents being different from one another.

7. A device according to claim 1, wherein the pick-up element includes an annular induction coil and an annular magnetic flux focusing element arranged coaxially with the multipolar ring and presenting a U-shaped cross-section having two end branches, wherein the end branches of the U-shaped cross section surround the induction coil and define an annular space in which the multipolar ring is located during rotation.

8. A device according to claim 7, wherein the parameter monitored is the pressure of the tire, and the critical threshold is constituted either by a minimum pressure threshold, or a maximum pressure threshold, or by both minimum and maximum pressure thresholds.

9. A device according to claim 7, wherein the parameter monitored in the temperature of the tire, and the critical threshold corresponds to a maximum temperature threshold.

10. A device according to claim 7, wherein the device monitors simultaneously the pressure and the temperature of the tire by means of two independent sources of current, each connected to the transmitter coil.

11. A device according to claim 7, wherein one of the end branches of the U-shaped cross-section of the flux focusing element has its end part provided with teeth regularly spaced circumferentially, each tooth having a width substantially the same as a circumferential width of one magnetized segment of the multipolar ring, all of the teeth being situated opposite magnetized segments of the multipolar ring having the same magnetic polarity.

12. A device according to claim 11, wherein the transmitter coil includes two or more independent parts, each being energized by a source of alternating current and corresponding to a specific parameter of the state of the tire, the frequencies of the currents being different from one another.

13. A device according to claim 11, wherein the parameter monitored is the pressure of the tire, and the critical threshold is constituted either by a minimum pressure threshold, or a maximum pressure threshold, or by both minimum and maximum pressure thresholds.

14. A device according to claim 11, wherein the parameter monitored is the temperature of the tire, and the critical threshold corresponds to a maximum temperature threshold.

15. A device according to claim 11, wherein the device monitors simultaneously the pressure and the temperature of the tire by means of two independent sources of current, each connected to the transmitter coil.

16. A device according to claim 7, wherein the two end branches of the U-shaped cross-section of the flux focusing element are provided with teeth, wherein a width of a tooth is substantially the same as a circumferential width of one magnetized segment of the multipolar ring, the teeth being regularly distributed circumferentially so that magnetic poles of a magnetized segment of the multipolar ring are respectively opposite the two end branches of the flux focusing element.

17. A device according to claim 16, wherein the transmitter coil includes two or more independent parts, each being energized by a source of alternating current and corresponding to a specific parameter of the state of the tire, the frequencies of the currents being different from one another.

18. A device according to claim 16, wherein the parameter monitored is the pressure of the tire, and the critical threshold is constituted either by a minimum pressure threshold, or a maximum pressure threshold, or by both minimum and maximum pressure thresholds.

19. A device according to claim 16, wherein the parameter monitored is the temperature of the tire, and the critical threshold corresponds to a maximum temperature threshold.

20. A device according to claim 16, wherein the device monitors simultaneously the pressure and the temperature of the tire by means of two independent sources of current, each connected to the transmitter coil.

21. A method for monitoring a state of a tire of a vehicle wheel and for measuring rotation characteristics of the wheel, comprising:
providing an encoder assembly including a multipolar magnetic ring with magnetized segments of different polarity distributed circumferentially in a regular and alternating manner, and providing a transmitter coil mounted coaxially with the multipolar magnetic ring on a rotating part of a wheel hub;
fixing the encoder assembly to the rotating part of the wheel hub;
delivering a signal representing the rotation characteristic of the wheel and the state of the tire using a stationary pick-up means which cooperates with the encoder assembly;
monitoring the state of the tire of the wheel in rotation by modifying characteristics of the encoder assembly according to a value of a predetermined parameter of the state of the tire;
energizing the transmitter coil with an alternating electric current either only when the value of the parameter monitored is considered to be abnormal with respect to a critical threshold, or continuously, wherein the transmitter coil generates a magnetic field superimposing itself on a magnetic field created by the multipolar ring, the frequency of the alternating current being situated outside a range of frequencies relating to variations in the magnetic field generated by the multipolar ring in rotation with the wheel, the amplitude of the magnetic field created by the transmitter coil being proportional to the value of the parameter monitored.

22. A method according to claim 21, wherein in the energizing step, the transmitter coil includes two or more independent pars, each being energized by a source of alternating current and corresponding to a specific parameter of the state of the tire, wherein the frequencies of the currents are different from one another.

23. A method according to claim 21, wherein the parameter monitored is the pressure of the tire, and the critical threshold is constituted either by a minimum pressure threshold, or a maximum pressure threshold, or by both minimum and maximum pressure thresholds.

24. A method according to claim 21, wherein the parameter monitored is the temperature of the tire, and the critical threshold corresponds to a maximum temperature threshold.

25. A method according to claim 21, wherein the pressure and the temperature of the tire are monitored simultaneously by two independent sources of current, each connected to the transmitter coil.

* * * * *